United States Patent Office 3,051,639
Patented Aug. 28, 1962

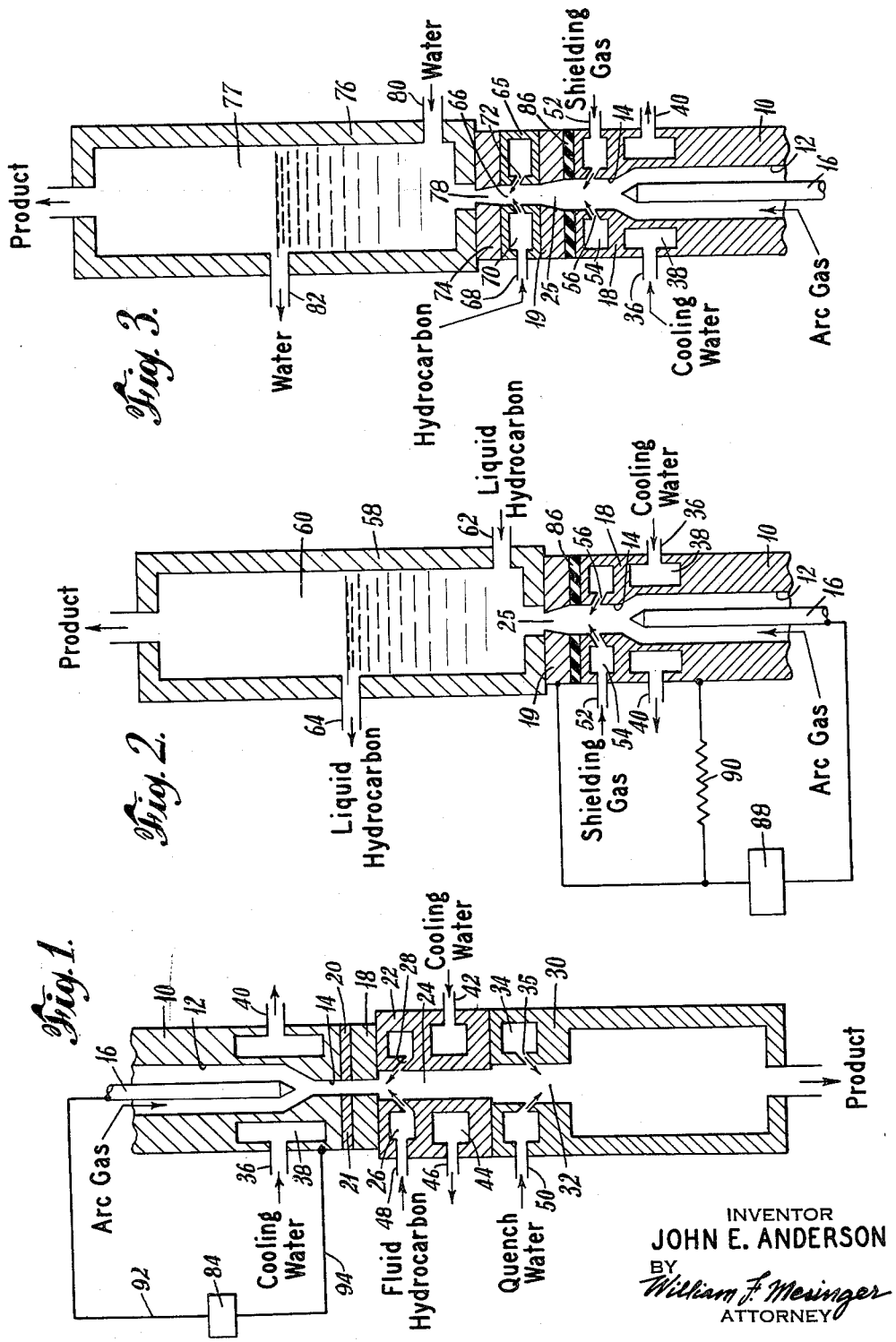

3,051,639
ARC TORCH CHEMICAL REACTIONS
John E. Anderson, Danville, Ind., assignor to Union Carbide Corporation, a corporation of New York
Filed Sept. 25, 1958, Ser. No. 763,418
25 Claims. (Cl. 204—171)

This invention relates to chemical reactions promoted by energy from a wall-stabilized electric arc and apparatus therefor. In particular, the invention relates to using a gas stream heated by a high intensity wall-stabilized electric arc as the source of heat and also in many cases as a source of chemically reactive species for chemical reaction promotion. More particularly, it relates to an improved process and apparatus for the production of unsaturated hydrocarbons, such as acetylene, by pyrolysis of fluid hydrocarbons, such as methane, which employs a gas stream, such as hydrogen, heated by a wall-stabilized electric arc as the source of heat.

Electric arcs have been used for many years as heat sources for promoting thermal and chemical reactions. The prior electric arc processes had the disadvantages of arc instability, undesirable variations in the arc temperature and the necessity for complex or bulky equipment. A further disadvantage in prior hydrocarbon pyrolysis processes using an electric arc was the formation of large quantities of carbon black.

It is the main object of the present invention to provide an electric arc process for chemical reaction promotion which is not subject to the disadvantages of prior processes as pointed out hereinabove.

It is a further object of the present invention to provide an improved arc process for pyrolysis of hydrocarbons to form more unsaturated hydrocarbons.

It is still a further object of the present invention to provide relatively simple compact apparatus for the production of acetylene by the pyrolysis of hydrocarbons in which large volumes of reactants can be rapidly pyrolyzed to produce high volume-percent yields of acetylene.

In the present invention, a gas such as hydrogen or argon is passed through a high intensity, wall-stabilized electric arc and the resulting stream of hot gas is mixed with a reactant material. For the production of acetylene, a gaseous or liquid hydrocarbon may be injected into the hot gas stream leaving such arc or the hot gas stream from such arc may be directed into a relatively large volume of liquid hydrocarbon.

A wall-stabilized arc is defined as an arc-gas stream which is laterally shaped and/or constricted by a nozzle orifice which is sufficiently proximate to the arc to accomplish the desired purposes. The portion of the arc positioned within the shaping orifice forms an extremely intense heat source. The criterion of wall-stabilization is achieved when the surrounding nozzle is close enough to the arc to result in an incipient voltage gradient increase along the so-contained portion of the arc. In the processes of producing a wall-stabilized arc useful in chemical reaction promotion, a preferred non-transferred arc construction is that wherein the nozzle surrounding the arc constitutes a primary electrode. The stabilized, directed and shaped hot gas effluent from the wall-stabilizing arc torch is then conveniently used to promote chemical reactions, such as cracking hydrocarbons to form acetylene in desirably high yields.

A detailed description of the construction and operation of arc torches having high intensity, wall-stabilized arcs is given in U.S. 2,806,124 entitled "Arc Torch and Process" and in U.S. 2,858,411 entitled "Arc Torch and Process," which issued October 28, 1958.

The method of the present invention has several particular advantages in chemical reaction promotion. One advantage is that the arc or torch gas is consistently heated to a selected heat content when forced through the wall-stabilizing nozzle. The torch gas heat content which produces the optimum reaction conditions and product yield can therefore be easily maintained over long periods of operation. The volumetric heat content of the torch gas can be easily varied by adjusting the arc intensity or the rate of gas flow. Another advantage useful in acetylene production is that the particular velocity of the gas flow can be selected and held constant so as to bring the acetylene produced in the pyrolysis reaction into a quenching zone within a desired period of time. This time between formation of acetylene and quenching is critical and desirably short for the highest yields of acetylene. Reaction times in the order of 1–4 milliseconds have been conveniently used. It is pointed out, however, that high yields of acetylene, though not necessarily optimum yields, may be obtained by the method of this invention even when there is considerable variation in the velocity of flow of the arc gas, in the intensity of the arc, and in the heat content of the effluent gas stream.

Apparatus suitable for practicing the present invention is shown in the attached drawing. FIGS. 1–3 are longitudinal sectional views of three embodiments of the invention applicable to chemical reaction promotion and especially for the production of acetylene.

With reference to FIG. 1, 10 is a cylindrical copper body member which contains a cylindrical bore 12. The bore 12 tapers to a cylindrical nozzle 14 in the anode section 18 of body 10. A cathode 16 is axially aligned within bore 12 and is spaced from the walls of body member 10. Cathode 16 is preferably in the form of a rod or pencil and is conveniently constructed of thoriated tungsten. Anode 18 and body member 10 may be conveniently made of copper. In order to prevent melting due to arc heat, the torch body 10 and anode section 18 are cooled by water or other cooling fluid. Even under these conditions the anode 18 is subject to severe arc erosion and pitting. It has been found that anode erosion can be practically eliminated by incorporating preferential electrode inserts in the anode nozzle wall. The preferential electrode is shown with inserts 20 and 21 each of which are in the shape of small rods. This insert could be of any desired shape as long as a surface is exposed to the nozzle passage. The preferential electrode may be of tungsten, tantalum or other material resistant to erosion by the high intensity electric arc. It is important that the insert be mounted so as to be partially thermally insulated from the adjacent cool anode material in order that the insert will operate at a higher temperature than the adjacent anode material. The exposed insert surface inside the nozzle passage thereby operates "hot" and the arc thus tends to strike the hot insert rather than the adjacent cool copper anode. This poor heat exchange relationship is conveniently obtained by loosely fitting the insert in the anode wall and making electrical connection by soldering only at the outer surface. The use of these tungsten inserts is especially effective in reducing anode erosion when an active diatomic gas, such as hydrogen or nitrogen is used as the arc gas. This torch modification using preferential electrode inserts is disclosed in copending application Serial No. 763,419, filed concurrently herewith, now U.S. Patent No. 2,951,143.

Reactor member 22 contains a cylindrical reaction chamber 24 axially aligned with nozzle 14. Reactor member 22 contains an annular chamber 26 which communicates with reaction chamber 24 through a plurality of circumferentially-disposed openings 28.

Quenching member 30 contains an elongated cylindrical quenching chamber 32 axially aligned with reaction chamber 24. Annular chamber 34 in quenching member 30 contains a plurality of circumferentially-positioned openings 35 in communication with quenching chamber 32.

During operation, body member 10 is cooled by water or other cooling fluid which enters through conduit 36, flows through annular chamber 38 and out through conduit 40. Reactor member 22 is cooled by water or other cooling fluid which enters through conduit 42, flows through annular chamber 44 and is discharged therefrom through conduit 46.

Cathode 16 and anode 18 are connected to a suitable source of electric power 84 by leads 92 and 94 respectively for energizing a high pressure arc across such electrodes. Typical arc circuits are shown in U.S. 2,858,411 referred to hereinabove. An arc gas such as hydrogen, argon, or other suitable gas or gas mixture is introduced through inlet means (not shown) into the annular space between bore 12 and cathode 16. The gas flows around cathode 16 and into nozzle 14. The arc between the electrodes is forced into the nozzle 14 by the flow of such gas, and the arc and gas are thereby stabilized by the walls of the nozzle and laterally constrained to conform to the dimensions of the nozzle. The arc gas is heated by the arc in the nozzle 14, is collimated to conform to the cross-sectional shape of the nozzle and is discharged into reaction chamber 24 as a hot, high velocity gas stream.

The fluid hydrocarbon stock to be pyrolyzed enters annular chamber 26 through hydrocarbon inlet conduit 48 and is injected through the openings 28 into the hot, high velocity gas stream entering reaction chamber 24 from nozzle 14. Pyrolyzing and cracking of the fluid hydrocarbon stock takes place in reaction chamber 24.

The hot gases leaving reaction chamber 24 enter quenching chamber 32 and are rapidly cooled by a spray of water or other cooling and quenching fluid. The quenching fluid enters annular chamber 34 through conduit 50 and is sprayed into quenching chamber 32 through the openings 35. The quenched reaction gases then pass to a collector (not shown). The reaction gases can then be separated into various components if desired.

The apparatus of FIG. 1 is preferably operated in a vertical position with the direction of gas flow downward from bore 12 into quenching chamber 32. However, the apparatus may be operated satisfactorily in an essentially horizontal position.

To obtain high yields of acetylene by pyrolysis of a fluid hydrocarbon, the quenching chamber 32 should be so positioned that quenching will take place rapidly after completion of the pyrolysis reaction. Reaction times of 1-4 milliseconds have been conveniently used.

FIG. 2 shows an apparatus modification which is suitable for pyrolysis of liquid hydrocarbons. In FIG. 2, body member 10, bore 12, nozzle 14, cathode 16, anode 18, conduit 36, annular chamber 38 and conduit 40 have a similar structure, arrangement and function as described hereinabove for the apparatus of FIG. 1 except as set forth below. Body member 10 contains shielding gas inlet conduit 52 and annular chamber 54 which communicates with the nozzle section 14 of bore 12 through a multiplicity of circumferentially-disposed openings 56. A shielding gas may be injected into nozzle section 14 through opening 56 in order to protect the primary anode from attack by active materials, such as hydrogen, in the main arc gas stream. The shielding gas should be inert to the anode material. Gases such as argon, helium, and nitrogen may be used as the shielding gas.

Annular insulating disk 86 electrically insulates anode 18 from primary anode 19. In the embodiment of the invention shown in FIG. 2, anode 18 functions as a secondary or pilot anode by completing a pilot arc between it and the cathode. This pilot arc tends to stabilize the main arc between the cathode and the primary anode and to re-establish the main arc if it should become extinguished. Pilot anode 18 is connected to the current source 88 through the ballast resistor 90 and is therefore at a lower potential than the primary anode 19.

Reactor member 58 contains an elongated reaction chamber 60 axially aligned with the passage 25 defined by nozzle 14 and anode 19. Liquid hydrocarbon enters chamber 60 through inlet conduit 62 and is discharged through outlet conduit 64, the height of the column of liquid hydrocarbon in chamber 60 being determined by the position of conduit 64.

The apparatus of FIG. 2 is primarily designed to operate in an upright position with the flow of gas directed upward. The velocity of the arc gas stream must be high enough to prevent liquid from passing back into the passage 25. An arc is established and arc gas flow maintained as described hereinabove for the apparatus of FIG. 1. The shielding gas is heated and collimated in the wall-stabilized arc passage since it becomes a part of the total arc-gas stream. The high velocity collimated stream of hot gas is discharged through passage 25 into the column of liquid hydrocarbon in reaction chamber 60. The pyrolysis reaction takes place in the lower portion of the reaction chamber 60 where the hydrocarbon liquid is heated and cracked by the hot gas stream. The cooler liquid hydrocarbon in the upper portion of chamber 60 quenches the hot products of the pyrolysis reaction within a few milliseconds after reaction has taken place. The quenched gaseous reaction products then pass into a collector (not shown). Means may be provided to recycle unreacted hydrocarbon from outlet conduit 64 to inlet conduit 62 and for cleaning and cooling the hydrocarbon stream.

FIG. 3 shows a further apparatus modification designed for the pyrolysis of fluid hydrocarbons. In FIG. 3, body member 10, bore 12, nozzle 14, cathode 16, pilot anode 18, primary anode 19, passage 25, conduit 36, annular chamber 38, conduit 40, shielding gas inlet conduit 52, annular chamber 54, openings 56 and annular insulating disk 86 have a similar structure, arrangement and function as described hereinabove for the apparatus of FIG. 2.

Annular injector member 65 defines the cylindrical passage 66 which is axially aligned with and communicates directly with the passage 25. Injector member 65 contains hydrocarbon inlet conduit 68, annular chamber 70 and a plurality of circumferentially-disposed openings 72.

Annular confining disc 74 separates injector member 65 from quenching member 76 and serves to force the arc gas and hydrocarbon fluid through a confined passage 78 into the quench liquid. This aids mixing of the arc gas and hydrocarbon as well as mixing of the effluent gas stream with the quench liquid. Confining disc 74 and passage 78 also help to produce a high enough velocity of the effluent gas stream to prevent flow of quench liquid back into passages 66 and 25. The central passage 78 in confining disc 74 forms a continuation of the channel defined by passage 25 and passage 66. The channel communicates directly with the elongated cylindrical quenching chamber 77 in quenching member 76. The passage 78 may be of substantially constant small cross-sectional area or may preferably taper gradually to a smaller cross-sectional area at the point of juncture of the passage 78 and quenching chamber 77. Water or other quenching fluid enters chamber 77 through conduit 80 and is discharged therefrom through conduit 82.

The arc is established and the flows of arc gas and shielding gas are maintained as described hereinabove for the apparatus of FIG. 2. The fluid hydrocarbon to be pyrolyzed is fed through conduit 68 into chamber 70 and is injected into the high velocity stream of hot torch and shielding gas through the openings 72. The hot reaction gases are quenched by directing the gas stream upward into the quenching fluid in chamber 77. The quenched gaseous reaction products then pass into a collector (not shown).

In the apparatus modifications described above body member 10, anode 18, and anode 19 may be made of copper or other electrically conductive material and cathode 16 of electrically emissive material such as thoriated tungsten. Reactor member 22, injector member 65 and confining disc 74 may be made of copper or other material which does not melt or react under process conditions. It is preferred that the inner wall of reactor member 22 which forms reaction chamber 24 have a thermal insulating layer composed of material such as carbon, tungsten or zirconia, for example. This layer should have a high melting point and a relatively low thermal conductivity. The acetylene yields or conversions of cracking stock to acetylene are thereby improved. Without being limited to any specific theory of operation, it is believed that this increased conversion is due to reduction of heat loss from the reaction chamber through the reactor walls. Quenching member 30, reactor member 58 and quenching member 76 may be constructed from Pyrex glass, Vycor glass, a ceramic, or any suitable metal.

The confining configuration of the arc torch used in this invention forces a substantial portion of the torch gas and shielding gas through the wall-stabilized arc. The gas heat content can be varied by control of the arc power and/or the gas velocity. Gas velocities up to sonic or higher can be used without blowing out the arc as would be expected with prior art electric arc processes.

It is apparent that relatively small equipment can be used in the method of the present invention because the higher gas velocities permit a high total gas throughput as compared with prior art electric arc processes.

Any gas which does not decompose to solid residues in the heat of the arc and which does not seriously attack the electrodes can be used as the torch gas or shielding gas. In the production of acetylene from hydrocarbons, it has been found desirable to add dissociable gases, such as oxygen or hydrogen, to the torch gas since dissociation products, such as atomic oxygen or atomic hydrogen, which are formed in the high-intensity arc help to increase the yields of acetylene.

Examples I–IV illustrate several embodiments of the present invention as applied to the production of acetylene from hydrocarbons. The approximate linear velocity of the effluent gas in the examples below varied from about 900 to 2900 feet per second. The effective temperature of the arc effluent in the examples below was about 5000° K.

Example I

The equipment shown in FIG. 1 was employed for this run. The diameter of the thoriated tungsten stick cathode, the bore of the torch nozzle anode, and the diameter of the tungsten inserts in the anode wall were all 1/8 in. The reaction zone was 19/64 in. I.D. and 1 in. long. The quench zone was 3/8 in. I.D. The torch was operated at 93 volts (direct current-straight polarity) and 149 amperes while hydrogen gas at 24.9 liters/min. (normal temperature and pressure) passed through the torch. Methane gas at 29.2 liters/min. (normal temperature and pressure) entered the reaction zone and contacted the hot hydrogen gas. The product gases were quenched by a water flow of 157 liters/hour. The product gases had the following analysis (gas chromatography method).

| Compound: | Vol.-percent |
| --- | --- |
| $C_2H_2$ | 13.3 |
| $C_2H_4$ | 0.4 |
| $CH_4$ | 4.2 |
| $H_2$+water vapor+higher acetylenes (by difference) | 82.1 |
|  | 100.0 |

It was calculated that 79% of the carbon in the raw material was converted to carbon in acetylene and that 90% of the methane actually cracked was converted to acetylene.

Example II

An arc torch consisting of 1/8 in. dia. tungsten cathode, a 1/8 in. dia. water-cooled copper nozzle pilot anode, and a water-cooled copper primary anode containing a central orifice tapered from 1/4 in. I.D. to 1/8 in. I.D. was used as the heat source in an experimental set-up shown in FIG. 2. Argon gas at about 8–10 liters/min. was passed through the torch while an arc was operated at 30 volts (direct current-straight polarity) and 80 amperes. The argon gas heated by the arc passed into kerosene contained in the reaction chamber where some of the kerosene was substantially simultaneously cracked and quenched to form acetylene. The product gas was separated from the kerosene and analyzed to contain about 10 volume-percent acetylene.

Example III

An arc torch apparatus of the type shown in FIG. 3 was used for this run. The torch tungsten cathode was 1/8 in. dia., the torch nozzle pilot anode was 1/8 in. dia. and the primary anode nozzle tapered from 3/4 in. to 1/8 in. dia. The hydrocarbon feed disk was 1/4 in I.D. and had 12 0.013-in. dia. holes spaced evenly in a circle for releasing propane gas into the cracking zone. The torch was operated at 49.3 volts (direct current-straight polarity) and 104 amperes while argon gas at 3.9 liters/min. and hydrogen gas at 3.7 liters/min. passed through the torch. Additional argon at 7.9 liters/min. was introduced through the shielding gas passages to protect the primary anode. The quench tube contained water passing through at 0.9 liter/min. The product gas was analyzed to contain 9.1 volume-percent acetylene.

Example IV

Apparatus of the type shown in FIG. 2 was used for this run. The torch was operated at 50 volts (direct current-straight polarity) and 80 amperes while a gas mixture of 1.0 liter/min. oxygen and 8.6 liters/min. argon passed through the nozzle into kerosene contained in the reaction chamber. The product gas was analyzed to contain 13.0 volume-percent acetylene.

Other unsaturated hydrocarbons, such as ethylene, can also be produced by the present invention. Control of the end product is obtained by varying the heat content of the effluent torch gas, the injected hydrocarbon and the quenching rate.

While the above disclosure has related primarily to production of unsaturated hydrocarbons, such as acetylene, the present invention can also be used for promotion of other chemical reactions. The main process steps to be followed are: pass a gas through a wall-stabilized arc, contact the resulting hot gas effluent with a reactant material, then quench the products. The torch gas could be inert wherein it becomes only a heat source or it could be active and thus enter into the chemical reaction. Examples V–VII illustrate the formation of hydrogen peroxide and hydrogen cyanide according to the present invention.

Example V

Torch apparatus of the type shown in FIG. 2 and quench apparatus of the type shown in FIG. 1 was used for this run. The torch was operated at about 41 volts (D.C.S.P.) and 110 amperes while argon gas at 3 liters per minute passed around the tungsten cathode and out through the torch nozzle. Additional argon shielding as at 2 liters per minute and 1.2 liters per minute oxygen gas were introduced downstream of the cathode. Quench water at 0.9 liter per minute was mixed with the hot oxygen-containing effluent from the torch. The quench water, which was also a reactant, was analyzed subsequent to reaction step to contain about 0.12 mole of hydrogen peroxide for each mole of oxygen used.

Example VI

Apparatus of the type shown in FIG. 2 was used for this run. The torch was operated at 62 volts and 72 amperes while about 4.7 liters per minute argon and about 4.6 liters per minute nitrogen passed through the nozzle into kerosene quench-reactant. The product gas analysis indicated about 14 volume percent hydrogen cyanide plus acetylene.

Example VII

Apparatus similar to the type used for Example VI above was employed. The torch was operated at 37 volts and 170 amperes while 45 cubic feet per hour (21.2 liters/min.) argon-nitrogen gas mixture containing 78 volume percent nitrogen passed through the arc and torch nozzle into kerosene reactant-quench. The product gas had the following gas chromatography analysis.

| Component | Volume percent |
| --- | --- |
| HCN | 4.42 |
| $C_2H_6$ | 0.48 |
| $C_2H_4$ | 3.97 |
| $C_2H_2$ | 8.18 |
| $C_3H_8$ | 0.14 |
| $C_3H_6$ | 1.09 |
| Argon, nitrogen and hydrogen | 81.72 |
| | (by difference) |

Hydrogen cyanide can thus be conveniently produced by this process.

Two preferred embodiments of the present invention are illustrated by Examples VIII and IX. The overall process conditions of conversion of reactant to product and power requirement, for example, can be improved by the preferred process modification of preheating the reactant. This is especially true in cracking of methane to produce acetylene by the present process. The effect of preheat is described in the following example.

Example VIII

Equipment similar to that used for Example I above was employed. The torch was operated at 8.2 kilowatts total power while about 33.8 liters/min. hydrogen gas passed through the arc and subsequently contacted a 38.8 liters/min. methane stream which had been preheated to about 450° C. The hot product gases were then quenched by a water spray and analyzed to contain about 11.0 volume percent acetylene. It was calculated that about 70% of the carbon in the methane was converted to carbon in acetylene and about 82% of the methane actually cracked was converted to acetylene. The power requirements were also calculated to be 5.0 kilowatt-hours/lb. of acetylene produced.

Similar operation using methane at room temperature under comparable operating conditions resulted in lowered results of 9.2 volume percent acetylene in the product gas, 63% conversion of carbon in methane to carbon in acetylene, 74% methane actually cracked being converted to acetylene, and power requirement of 7.4 kilowatt-hours/lb. of acetylene produced.

The effect of employing a refractory liner in the reaction chamber to improve results is described in the following example.

Example IX

Equipment similar to that used for Example I above was employed with the improvement of incorporating a 7/16 inch thick insulating liner of thermatomic carbon along the reaction chamber wall. The torch was operated at 8.5 kilowatts total power while about 29.4 liters/min. hydrogen passed through the collimated arc and subsequently contacted a 40.5 liters/min. methane stream. The hot product gases were then quenched by a water spray. It was calculated that about 83% of the methane was converted to acetylene. The power requirement was 4.5 kilowatt-hours/lb. of acetylene produced and the thermal efficiency (heat from arc-gas available for reaction and not otherwise lost) was 47%.

Similar operation under comparable operating conditions without use of refractory liner in the reaction chamber resulted in lowered results of 71% conversion of methane to acetylene, power requirement of 5.0 kilowatt hours/lb. of acetylene produced and 42% thermal efficiency.

In another preferred embodiment of the invention, illustrated by Example X, the cracking stock comprises a mixture of gaseous hydrocarbon and hydrogen. It has been found that as the hydrogen content is increased, the carbon formation decreases. This is important from an operating viewpoint since it reduces the maintenance problems of removing carbon deposits which plug the reactor and of keeping the reactor clean. A cracking stock mixture of 60 volume percent hydrogen and 40 volume percent methane givese very little carbon formation while providing a high yield of acetylene.

Example X

Apparatus of the type shown in FIG. 1 was used wherein the reactor consisted of a ¾-in. I.D. and 2½-in. long carbon tube thermally insulated on its exterior with thermatomic carbon. Two ⅛-in. diameter cylindrical tungsten inserts in the torch nozzle wall formed the preferential anode. Hydrogen gas at 76.0 gram-moles/hr. (28.4 liters/min. NTP) passed through the torch where it was heated by 12.2 kilowatts electrical power. This hot hydrogen steam then contacted a mixed feed stock stream of 267.5 gram-moles/hr. (100 liters/min. NTP) containing 40 volume percent methane and 60 volume percent hydrogen. The reaction gases were then rapidly quenched with water. The product gas contained 9.6 volume percent acetylene. Calculations indicated that 90.1% of the reacted methane was converted to acetylene.

The conversion of hydrocarbons to acetylene can be further improved in the present invention by employing hydrogen in the quenching step. The hydrogen apparently combines with some of the unreacted carbon from the hydrocarbon feed stock to form additional acetylene. This process modification is described in the following example.

Example XI

Equipment similar to that of Example X was used with the addition of a separate set of quench inlet holes for hydrogen. These were positioned between the fluid hydrocarbon feed ports and the water spray nozzles. Hydrogen gas at 75.6 gram-moles/hr. (28.2 liters/min. NTP) passed through the torch where it was heated by 16.1 kilowatts of total electrical power. This hot hydrogen stream then contacted a stream of 119 gram-moles/hr. (44.4 liters/min. NTP) methane. The reaction gases were then rapidly contacted with and partially quenched by 36.2 gram-moles/hr. (13.5 liters/min. NTP) hydrogen followed by complete quenching with water. Calculations based on analysis of product gas indicated that 90.0% of the reacted methane was converted to acetylene. A similar run which did not use hydrogen partial quench had a conversion of about 83% of the reacted methane to acetylene.

What is claimed is:

1. A process for chemical reaction promotion which comprises energizing a high-pressure arc of predetermined arc intensity, flowing at a controllable rate an arc gas stream through said high-pressure arc to form a resulting steam of hot arc gas having a variable volumetric heat content, said heat content being determined by the flow rate of said arc gas stream at a predetermined arc intensity, collimating such hot arc gas, chilling the outer layer of said hot arc gas to wall-stabilize such arc, discharging the resultant collimated hot arc gas at a preselected velocity into a reaction zone, intimately mixing the discharged stream of hot arc gas with a reactant in said reaction zone whereby said reactant undergoes chemical change, then rapidly cooling and quenching the reaction products.

2. A process for the pyrolysis and cracking of fluid hydrocarbons which comprises energizing a high-pressure arc having a predetermined arc intensity, flowing at a controllable rate an arc gas stream through said high-pressure arc to form a resulting stream of hot arc gas having a variable volumetric heat content, said heat content being dependent on the rate of arc gas flow at a given arc intensity, collimating such hot arc gas, chilling the outer layer of said hot arc gas to wall-stabilize such arc, discharging the resultant collimated hot arc gas at a preselected velocity into a reaction zone, intimately mixing the effluent stream of hot arc gas with a supply of fluid hydrocarbon stock in said reaction zone to pyrolyze and crack said stock, passing the hot pyrolysis products within a certain period of time determined by said preselected discharge velocity into a quench zone to suddenly cool such products and then recovering the pyrolysis products.

3. A process for the pyrolysis and cracking of fluid hydrocarbons which comprises energizing a high-pressure arc having a predetermined arc intensity, flowing at a controllable rate an arc gas stream through said high-pressure arc to form a resulting stream of hot arc gas having a variable volumetric heat content, said heat content being dependent on the rate of arc gas flow at a given arc intensity, collimating such hot arc gas, chilling the outer layer of said hot arc gas to wall-stabilize such arc, discharging the resultant collimated hot arc gas at a preselected velocity into a fluid hydrocarbon stock to pyrolyze said stock, rapidly cooling and quenching the hot pyrolysis products and recovering the pyrolysis products.

4. Process according to claim 3 wherein said fluid hydrocarbon is a liquid hydrocarbon.

5. A process for the production of acetylene by the pyrolysis of fluid hydrocarbons which comprises energizing a high-pressure arc having a predetermined arc intensity, flowing at a controllable rate an arc gas stream through said high-pressure arc to form a resulting stream of hot arc gas having a substantially constant heat content determined by said predetermined arc intensity and by maintaining said controllable flow rate of arc gas substantially constant, collimating such hot arc gas, chilling the outer layer of said hot arc gas to wall-stabilize such arc, discharging the resultant collimated hot arc gas at a preselected velocity, intimately mixing the effluent stream of hot arc gas with a supply of fluid hydrocarbon stock to pyrolyze and crack said stock and produce acetylene, passing the acetylene-containing hot pyrolysis product within a fixed period of time determined by said preselected discharge velocity into a quench zone to suddenly cool such products and then recovering the acetylene therefrom whereby increased yields of acetylene are obtained.

6. A process according to claim 5 wherein said discharge arc gas velocity is preselected to be substantially sonic velocity.

7. Apparatus for chemical reaction promotion comprising an electrically conductive body provided with a nozzle having an internal cooling liquid passage in the interior of the wall thereof, a stick electrode disposed within said body and terminating in spaced relation to the interior of said nozzle, means for supplying gas to the inside of said body for discharge through said nozzle, a refractory metal preferential electrode associated with said nozzle, arc current circuit means including said body and nozzle for energizing a high-pressure arc between the end of said stick electrode and said preferential electrode, said preferential electrode being mounted in said nozzle so that while arc current is conducted through the nozzle to such preferential electrode, the thermal contact therebetween is relatively poor, causing the preferential electrode to operate at a substantially higher temperature and thus become more attractive as an arc terminal than the nozzle per se, a reactor member having a reaction chamber adjacent to and in axial alignment with said nozzle for intimately mixing the hot arc gas effluent with a fluid reactant and a quenching chamber in axial alignment with said reaction chamber and having means for spraying a quenching fluid into said quenching chamber for quickly cooling the reaction products.

8. Apparatus according to claim 7 wherein said preferential electrode is formed of tungsten.

9. Apparatus for production of acetylene by the pyrolysis and cracking of fluid hydrocarbons comprising an electrically conductive body provided with a nozzle having an internal cooling liquid passage in the interior of the wall thereof, a stick electrode disposed within said body and terminating in spaced relation to the interior of said nozzle, means for supplying gas to the inside of said body for discharge through said nozzle, a refractory metal preferential electrode associated with said nozzle, arc current circuit means including said body and nozzle for energizing a high-pressure arc between the end of said stick electrode and said preferential electrode, said preferential electrode being mounted in said nozzle so that while arc current is conducted through the nozzle to such preferential electrode, the thermal contact therebetween is relatively poor, causing the preferential electrode to operate at a substantially higher temperature and thus become more attractive as an arc terminal than the nozzle per se, a reactor member having a reaction chamber adjacent to and in axial alignment with said nozzle for intimately mixing the hot arc gas effluent with a fluid hydrocarbon stock to pyrolyze said stock and form acetylene and a quenching chamber in axial alignment with said reaction chamber and having means for spraying a quenching fluid into said quenching chamber for quickly cooling the acetylene formed.

10. Process for production of hydrogen peroxide which comprises flowing an oxygen-containing arc-gas stream through a high intensity wall stabilizing electric arc torch, intimately mixing the effluent stream of hot gas from said torch with water reactant, whereby said reactant undergoes chemical change, then rapidly cooling and quenching the hydrogen peroxide-containing reaction products.

11. Process for production of hydrogen cyanide which comprises flowing a nitrogen-containing arc-gas stream through a high intensity wall-stabilizing electric arc torch, intimately mixing the effluent stream of hot gas from said torch with fluid hydrocarbon, whereby said hydrocarbon undergoes chemical change, then rapidly cooling and quenching the hydrogen cyanide containing reaction products.

12. Process according to claim 2 wherein said arc-gas is hydrogen.

13. Process according to claim 2 wherein said arc-gas is argon.

14. Process according to claim 4 wherein said arc-gas is a mixture of argon and hydrogen.

15. Process according to claim 2 wherein said arc-gas is a mixture of argon and oxygen.

16. Process according to claim 2 wherein said hydrocarbon is in an aliphatic hydrocarbon.

17. Process according to claim 2 wherein said hydrocarbon is methane.

18. Process according to claim 2 wherein said hydrocarbon is propane.

19. Process according to claim 2 wherein said hydrocarbon stock is kerosene.

20. Apparatus in accordance with claim 7 wherein said means for intimately mixing said effluent of hot gas with a reactant includes a reaction chamber having thermally insulated walls.

21. Apparatus for the pyrolysis of fluid hydrocarbons comprising, in combination, a stick primary electrode; a secondary electrode having a nozzle passage; a second primary electrode having a nozzle passage; means for supplying a stream of arc gas through said secondary electrode passage and said second primary electrode passage; means for establishing a primary arc between said primary electrodes and a secondary pilot arc between said stick electrode and said secondary electrode, whereby a portion of said primary arc is wall-stabilized and an effluent in the form of a hot gas stream is provided; means for intimately mixing said hot gas effluent with fluid hydrocarbon stock to pyrolyze said stock; and means for rapidly quenching the hot pyrolysis products.

22. Apparatus for the production of acetylene according to claim 9 wherein said means for intimately mixing said effluent of hot gas with fluid hydrocarbon stock includes a reaction chamber having thermally insulated walls.

23. Apparatus according to claim 22 wherein the reaction chamber walls are insulated with thermatomic carbon.

24. Apparatus according to claim 22 wherein the reaction chamber walls are insulated with tungsten.

25. Process in accordance with claim 2 wherein said hydrocarbon stock comprises a mixture fluid hydrocarbon and hydrogen.

References Cited in the file of this patent

UNITED STATES PATENTS

| | | |
|---|---|---|
| 2,013,996 | Bauman et al. | Sept. 10, 1935 |
| 2,806,124 | Gage | Sept. 10, 1957 |
| 2,819,423 | Clark | Jan. 7, 1958 |
| 2,858,411 | Gage | Oct. 28, 1958 |
| 2,916,534 | Schallus et al. | Dec. 8, 1959 |
| 2,951,143 | Anderson et al. | Aug. 30, 1960 |
| 2,005,762 | Fenn | Oct. 24, 1961 |